United States Patent [19]
Talling et al.

[11] Patent Number: 5,472,917
[45] Date of Patent: Dec. 5, 1995

[54] RAW MATERIAL BRIQUETTE FOR MINERAL WOOL PRODUCTION AND PROCESS FOR ITS PREPARATION AND ITS USE

[75] Inventors: Bob Lars O. Talling, Åbo, Finland; Mariana Sarudis, Skövde, Sweden

[73] Assignee: Paroc Oy AB, Pargas, Finland

[21] Appl. No.: 975,937

[22] PCT Filed: Aug. 28, 1991

[86] PCT No.: PCT/FI91/00266

§ 371 Date: Apr. 21, 1993

§ 102(e) Date: Apr. 21, 1993

[87] PCT Pub. No.: WO92/04289

PCT Pub. Date: Mar. 19, 1992

[30] Foreign Application Priority Data

Aug. 29, 1990 [FI] Finland ............ 904261

[51] Int. Cl.⁶ .............. C03C 6/10; C03C 13/06
[52] U.S. Cl. ............... 501/28; 501/36; 65/19; 106/714; 106/789; 106/791
[58] Field of Search ............ 501/28, 36; 65/19; 106/714, 789, 791

[56] References Cited

U.S. PATENT DOCUMENTS

| | | | |
|---|---|---|---|
| 447,360 | 3/1891 | Rockwell | 501/28 X |
| 544,706 | 8/1895 | Whiting | 106/789 |
| 1,711,676 | 2/1916 | Sutcliffe | 65/19 |
| 2,976,162 | 3/1961 | Ekdahl | 501/28 X |
| 3,294,505 | 12/1966 | Garrison | 65/17 |
| 4,518,432 | 5/1985 | Hess et al. | 501/28 X |
| 4,545,797 | 10/1985 | Elattar | 65/19 |
| 4,617,045 | 10/1986 | Bronshtein | 501/28 X |
| 4,662,941 | 5/1987 | Hagerman | 106/714 |
| 4,720,295 | 1/1988 | Bronshtein | 501/28 X |
| 4,778,523 | 10/1988 | Tomari et al. | 501/28 X |
| 4,818,289 | 4/1989 | Mäntymäki | 106/791 |
| 5,100,840 | 3/1992 | Urabe | 501/28 X |

FOREIGN PATENT DOCUMENTS

| | | | |
|---|---|---|---|
| 0037249 | 4/1981 | Japan | 501/36 |
| 0131534 | 7/1984 | Japan | 501/36 |
| 1048473 | 3/1986 | Japan | 65/19 |
| 0048472 | 3/1986 | Japan | 106/789 |
| 1048470 | 3/1986 | Japan | 106/789 |
| 205247 | 6/1991 | Sweden . | |
| 0881036 | 11/1981 | U.S.S.R. | 106/791 |
| 1038315 | 8/1983 | U.S.S.R. | 106/714 |

*Primary Examiner*—Mark L. Bell
*Assistant Examiner*—David Sample
*Attorney, Agent, or Firm*—Armstrong, Westerman, Hattori, McLeland & Naughton

[57] ABSTRACT

The invention concerns a raw material briquette for mineral wool production containing a mineral raw material as well as a binder therefor. The invention is characterized in that the briquette, as the binder, contains slag which has been activated with an alkaline agent, such as with an alkalimetal compound. The invention also concerns a process for the preparation of the briquette as well as a process for the preparation of mineral fibres using the briquette according to the invention.

14 Claims, No Drawings

RAW MATERIAL BRIQUETTE FOR MINERAL WOOL PRODUCTION AND PROCESS FOR ITS PREPARATION AND ITS USE

This invention concerns a raw material briquette for mineral wool production containing mineral raw material and binder therefore. The invention also concerns a process for the preparation of this briquette, as well as a process for the production of mineral wool, wherein the briquettes according to the invention are used as raw material.

Mineral wool is manufactured by melting mineral raw material in a melting furnace, either in a traditional cupola furnace, in a gas cupola furnace or in an electrical furnace. In the different furnace types, heat energy is introduced in the mineral raw material in different ways: in a traditional cupola furnace the mineral raw material is charged together with a fuel, usually coke, in a gas cupola furnace heat is introduced by burning gas or some other fluid fuel and in an electrical furnace electrodes are used which extend into the furnace.

One problem with cupola furnaces is that only relatively coarse material can be used as a more finely ground material has a tendency to form a compact mass in the furnace, which makes the necessary flow of air and flue gases through the charge difficult. In addition, finely ground material is more difficult to handle and it gives rise to inconvenient dust formation, wherefore the use of finely ground material is problematic also in electrical furnaces. Consequently it is not possible to use all the raw material sources which otherwise would be available, e.g. the waste, i.e. excess fibres and unfiberized material, so called pearls, which are produced during mineral wool manufacture, certain slag types, industrial waste from flotation processes, or e.g. the finest fractions from crushing of coarser material. This naturally means an economical loss, but also a limitation of available raw material compositions, e.g. when producing special fibres.

In connection with cupola furnaces one has tried to solve the problem by forming the finer raw material into raw material briquettes containing e.g. coal and coke (SE 8301233.6). Thus it is known to use, as a binder in raw material briquettes, hydraulic binders, especially portland cement and clay. The use of portland cement has the disadvantage that the briquette exhibits poor heat durability and loses its strength and turns brittle already at relatively low temperatures of 400° to 500° C., whereby the problem relating to the presence of particulate material in the furnace by no means is obviated. In the FI-patent application 840296 there is suggested the use of a briquette which, besides other mineral raw material, contains at least 20 percent of waste material from mineral wool production and at least 35 percent of a clay binder. A disadvantage with such a briquette are the high amounts of binder used, which provide for a large addition on the one hand of iron and on the other hand of aluminium in the mineral melt, which additions are not always of advantage in the finished mineral fibre, e.g. when a higher degree of solubility of the fibre is desired. Another disadvantage with clay bound briquettes is their poor moisture resistance, wherefore during storage they tend to take up water and disintegrate.

The aim of the present invention is to overcome the afore-mentioned drawbacks and provide a raw material briquette which exhibits good characteristics both during manufacture, i.e. good production economy, as well as good strength characteristics after manufacture, e.g. good storage resistance, especially against moisture, as well as good characteristics during mineral wool production itself, irrespective if this takes place in a cupola or an electrical furnace. The latter requirement means that the briquette does not disintegrate at low furnace temperatures, i.e. at temperatures below 1000° C., and that its melting behaviour is well defined. This means that by regulating the components in the briquette it is actually possible to regulate to some degree the melting conditions in the furnace, e.g. the melting point for the raw material charge. The briquette also makes a better use of the available raw materials possible, especially the use of less valuable and thus economically more favourable raw materials, such as surplus and waste materials from various industrial processes.

The above mentioned advantages are obtained with a briquette according to the invention, which is characterized in that, as the binder, slag activated with an alkaline agent is used.

As the slag, preferably blast furnace slag is used, which is commercially available in a rapidly cooled, granulated form and which exhibits a glassy structure which is beneficial from the point of view of obtaining a good binding effect, i.e. the blast furnace slag is in a form where it may be activated easily. It is to its quality relatively even and to its component composition optimal from the point of view of the finished mineral fibre product. A typical blast furnace slag composition is the following:

| | |
|---|---|
| $SiO_2$ | 35.1 |
| $TiO_2$ | 2.9 |
| $Al_2O_3$ | 7.6 |
| $Fe_2O_3$ | 0.4 |
| $MgO$ | 12.2 |
| $CaO$ | 38.1 |
| $Na_2O$ | 1.3 |
| $K_2O$ | 0.7 |
| $S$ | 1.5 |

The slag is finely ground (specific surface>200 $m^2$/kg) and activated by adding an activator giving an alkaline reaction in water. As the alkaline agent, any alkaline compounds suitable for the purpose may be used. Preferred alkaline agents are the alkali metal or alkaline earth metal compounds, such as hydroxides, carbonates, hydrogen carbonates, silicates etc., especially the alkali metal compounds, e.g. sodium hydroxide, carbonate or silicate or combinations thereof.

If, as in this case, good strength properties and a rapid development of the strength, as well as a good compatibility with other mineral materials (raw materials) are desired, high-ionic alkali compounds should be used for activation. The mechanism when using alkali hydroxide is that the high concentration of OH-ions (high pH) quickly hydrolyses the slag. When an alkali carbonate or silicate is used, it is advantageous to use additives (accelerators). These react via ion exchange to form precipitates of calcium silicate hydrate and/or carbonate and thus to liberate OH-ions, whereby the same mechanism as that relating to the use of alkali hydroxide applies. An advantage of using silicate and/or carbonate is that the finely dispersed precipitate functions as nuclei for continued hydration, which accelerates the hardening process substantially. Suitable as an accelerator is active lime, e.g. in the form of CaO, $Ca(OH)_2$, or portland cement clinker. By adding an accelerator the finished briquette reaches rapidly good strength during briquetting, both at normal temperature and during heat curing.

The amount of alkaline agent, calculated as respective component, is suitably 0.5% to 12% by weight calculated on the dry slag. Expressed as Na₂O-equivalents, a suitable amount is 2 to 4 % by weight. The amount of accelerator is suitably 1 to 10 % by weight of the dry slag, preferably 2 to 5% by weight. The accelerator is added separately in dry form or by grinding it together with the slag. The amount of slag can on the other hand vary within wide limits depending on the reactivity of the used raw material, but the ratio of slag to raw material is for most raw materials within the range 1:100 to 1:1, preferably within the range 1:100 to 1:4.

As the slag to its composition is almost optimal as regards fibre manufacture, the remaining components can be chosen more freely, and the use of slag as a binder especially makes it possible to utilize more low grade starting materials, e.g. industrial waste from flotation processes. Briquetting by using slag alkali binders thus provide for a substantial broadening of available starting materials, as the binder is not sensitive to contaminants, and not to e.g. organic components either which can originate from recirculated mineral wool from mineral wool production, as well as other recirculated materials, e.g. broken glass. In addition, it is possible to use all grades of the raw material, i.e. also the finest dust, which earlier has been difficult to introduce in the melting furnace charge.

The slag alkali binders thus has a positive effect on several levels: on the one hand it functions satisfactorily as a binder in the briquette forming process itself, and on the other hand it functions in an optimal manner during mineral wool production in the melting furnace. In addition, it provides for a wider variation of the choice of raw materials.

During briquette formation, the briquette hardens rapidly to form a heat and cold resistant briquette which, contrary to cement and clay bound briquettes, better withstands storage under moist conditions, e.g. outdoor storage. During the melting process in the melting furnace, the slag alkali binder forms a matrix which keeps the briquette together, which matrix "collapses", i.e. is completely transformed from the solid to the molten condition, only at a very high temperature, usually above 1200° to 1300° C. This means that the melting conditions are substantially more even and controllable as compared to cement and clay bound briquettes. Activated slag used in higher amounts namely raises the melting point and becomes melting point controlling for the entire melting furnace charge. In such cases it is also possible to mix in the charge materials which are more difficult to melt, e.g. olivine.

By using, according to the invention, slag alkali binder instead of cement and clay, it is also possible to minimize the Fe- and Al-concentrations in the melt and thus in the finished fiber.

The invention also concerns a method for the preparation of raw material briquettes for mineral wool production, whereby mineral raw material is mixed with a binder and water, and shaped to form briquettes, which are hardened. The method is characterized in that as the binder slag is used which is activated by the addition of an alkaline agent.

Hereby one suitably proceeds so that the dry briquette components are mixed, water and an alkaline solution are added in suitable amounts and the mixture obtained is formed, in a manner known, into briquettes. The size of the briquettes may vary, but a suitable volume is approximately 0.5 to 1.0 dm³.

The invention also relates to a process for the production of mineral fibres, whereby the mineral raw material in the form of briquettes are introduced into a melting furnace, the melt formed is withdrawn and made into fibres, whereby the process is characterized in that the briquettes as a binder contain slag, which has been activated with an alkaline agent.

Naturally it is possible within the scope of invention to use as raw material the said briquettes together with other raw material, e.g. such that has a suitable lump size, whereby available raw materials can be utilized up to 100% for mineral wool production.

EXAMPLE

In order to study the characteristics, especially the handling characteristics after two hours and final strength after 7 days, a number of briquettes were made in which the binder alkali activated slag was used, and three briquette types, in which portland cement was used as the binder.

The briquettes were made by mixing the dry components in a concrete mixer, whereafter water was added in such an amount that a stiff mixture was obtained. Thereafter the alkali was added in the form of a solution. Thereafter the mass was formed by compressing or compression vibration into briquettes, the strength properties of which were tested on the one hand after two hours in order to determine their readiness for handling, and on the other hand after 7 days to test their final strength. The testing was carried out by using known standard procedures.

In the following Table the recipes for the known briquettes and for the briquettes according to the invention are compiled, together with the strength results obtained.

TABLE I

|  | R1 | R3 | R5 | R2 | R4 | R6 | R7 | R8 | R9 |
| --- | --- | --- | --- | --- | --- | --- | --- | --- | --- |
| Composition (% by weight) | | | | | | | | | |
| cement | 15 | 20 | 15 | | | | | | |
| blast furnace slag[1] | | | | 20 | 20 | 13 | 20 | 26 | 17 |
| broken glass | | 10 | | | 5 | | 25 | 10 | |
| dolom. limestone | 5 | | | 5 | | | | | |
| basalt | 55 | 60 | | 60 | 70 | | 5 | 51 | |
| sand | 10 | | 85 | 5 | | 74 | 45 | 11 | 74 |
| alkali comp.[2] | 15 | 10 | 5 | 10 | 5 | 12* | 5 | 2** | 9* |
| total | 100 | 100 | 100 | 100 | 100 | 100 | 10 | 100 | 100 |
| Strength (MPa) 2h/60° C. | | | | | | | | | |
| prism weight | 562 | 602 | 567 | 598 | 628 | 592 | 634 | 604 | 650 |

TABLE I-continued

|  | R1 | R3 | R5 | R2 | R4 | R6 | R7 | R8 | R9 |
| --- | --- | --- | --- | --- | --- | --- | --- | --- | --- |
| (g) |  |  |  |  |  |  |  |  |  |
| density (kg/dm$^3$) | 2.20 | 2.35 | 2.21 | 2.34 | 2.45 | 2.31 | 2.48 | 2.36 | 2.54 |
| compressive strength | 1.4 | 1.2 | 2.7 | 5.2 | 13.3 | 8.3 | 18.4 | 15.0 | 25.0 |
| tensile strength in bending 7d/20° C. | 0.3 | 0.3 | 0.9 | 1.0 | 2.3 | 1.7 | 3.4 | 3.2 | 4.6 |
| prism weight (g) | 568 | 600 | 561 | 594 | 628 | 590 | 634 | 602 | 650 |
| density (kg/dm$^3$) | 2.22 | 2.34 | 2.19 | 2.32 | 2.45 | 2.30 | 2.48 | 2.35 | 2.54 |
| compressive strength | 8.0 | 13.7 | 3.5 | 29.4 | 37.1 | 20.4 | 30.8 | 31.6 | 45.1 |
| tensile strength in bending | 2.2 | 3.2 | 1.9 | 6.5 | 8.3 | 5.1 | 7.5 | 7.7 | 8.4 |

$^1$contains 4% co-ground clinker
$^2$Na$_2$CO$_3$ except *Na$_2$CO$_3$ + Na$_2$SiO$_3$, **Na$_2$SiO$_3$ The results show the good strength characteristics which are obtained in accordance with the invention, compared to the results which are obtained with briquettes in which portland cement is used as the binder. Especially good are the final strengths of the briquette.

Briquettes have also been made from sand stone and lump slag as bulk raw material, using on the one hand portland cement and on the other hand blast furnace slag together with filter dust from the cement industry, which is rich in CaO, and alkali compounds. In the following Table the parts in weight of the different components are given. The compositions are comparable as regards amounts and type of raw material, but they contain either cement or alkali activated slag as the binder. The amount of binder is the same in corresponding compositions. The briquettes according to the invention contain, in addition, small amounts of CaO as an accelerator.

TABLE II

| Composition | 1 | 2 | 3 | 4 | 5 | 6 |
| --- | --- | --- | --- | --- | --- | --- |
| sand stone (<8 mm) | 69 | 69 | 68 | 68 | 80 | 80 |
| lump slag (<8 mm) | 21 | 21 | 18 | 18 |  |  |
| portland cement | 10 |  | 14 |  | 20 |  |
| blast furnace slag |  | 9 |  | 14 |  | 20 |
| filter dust |  | 0.6 |  | 0.8 |  | 0.8 |
| alkalisilicate |  | 0.8 |  | 1.0 |  | 1.6 |
| compr. strength (MPa) 4h/70° C. | 2.5 | 6.7 | 5.6 | 12.8 | 11.8 | 27.2 |

The above results again reflect the good strength properties obtained for the briquettes according to the invention compared to cement bound briquettes.

We claim:

1. Raw material briquette for mineral wool production containing a mineral raw material, and a binder, the binder consisting essentially of granulated and finely divided blast furnace slag which has been activated with an alkaline alkali metal compound and an accelerator selected from the group consisting of CaO, Ca(OH)$_2$, and portland cement clinker.

2. Raw material briquette according to claim 1, wherein the weight ratio between the slag and other raw materials is 1:100 to 1:1.

3. Raw material briquette according to the claim 1, wherein the slag is activated with an alkali metal compound selected from the group consisting of hydroxides, carbonates and silicates.

4. Process for the production of a raw material briquette for a mineral wood production, comprising adding an alkaline alkali metal compound to slag to form a binder consisting essentially of slag activated by the alkaline alkali metal compound, adding an accelerator selected from the group consisting of CaO, Ca(OH)$_2$, and portland cement clinker, mixing mineral raw material with the binder and water into a mixture, shaping the mixture into briquettes, and hardening the briquettes.

5. Process according to claim 1, wherein finely divided mineral raw material including recirculated material is used.

6. Process according to claim 3, wherein the finely divided mineral raw material includes a material selected from the group consisting of residual material from mineral wool production, flotation waste and glass waste.

7. Process according to claim 4, wherein the alkali metal compound is selected from the group consisting of hydroxides, carbonates and silicates.

8. Process according to claim 7, wherein the accelerator is included in amount of 1 to 10% by weight of the slag.

9. Process according to claim 8, wherein the accelerator is added to the mixture together with the slag.

10. Process according to claim 4 wherein the alkali metal compound is in an amount of 0.5 to 12% by weight of the slag.

11. Process according to claim 10, wherein the accelerator is included in amount of 1 to 10% by weight of the slag.

12. Process according to claim 11, wherein the accelerator is added to the mixture separately from the slag.

13. Process according to claim 4, wherein the accelerator is added to the mixture together with the slag.

14. Process for mineral wool production, comprising adding mineral raw material in the form of briquettes to a melting furnace, withdrawing a formed melt from the melting furnace and fiberizing the formed melt, the briquettes including a binder containing slag activated with an alkaline alkali metal compound and an accelerator selected from the group consisting of CaO, Ca(OH)$_2$, and portland cement clinker.

* * * * *